Oct. 31, 1961   J. A. GREER   3,006,553
RADIAL HEAD ARMORED INSULATED JOINT
Filed June 17, 1959   2 Sheets-Sheet 1
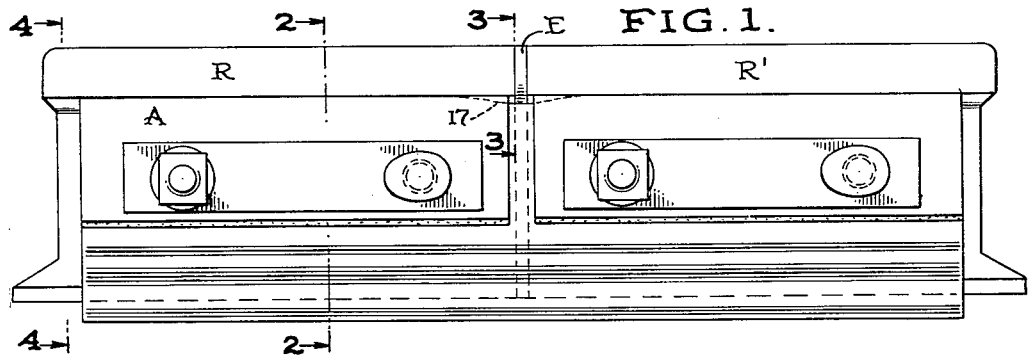
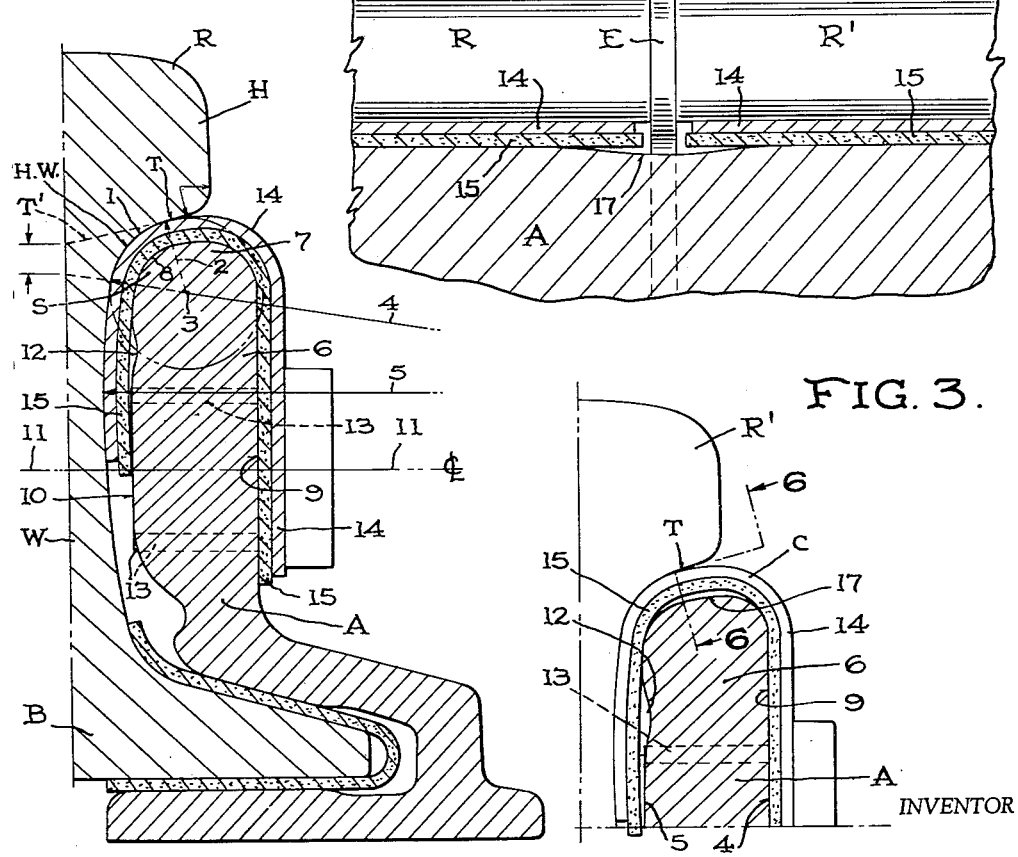
INVENTOR
JAMES A. GREER
BY
ATTORNEY

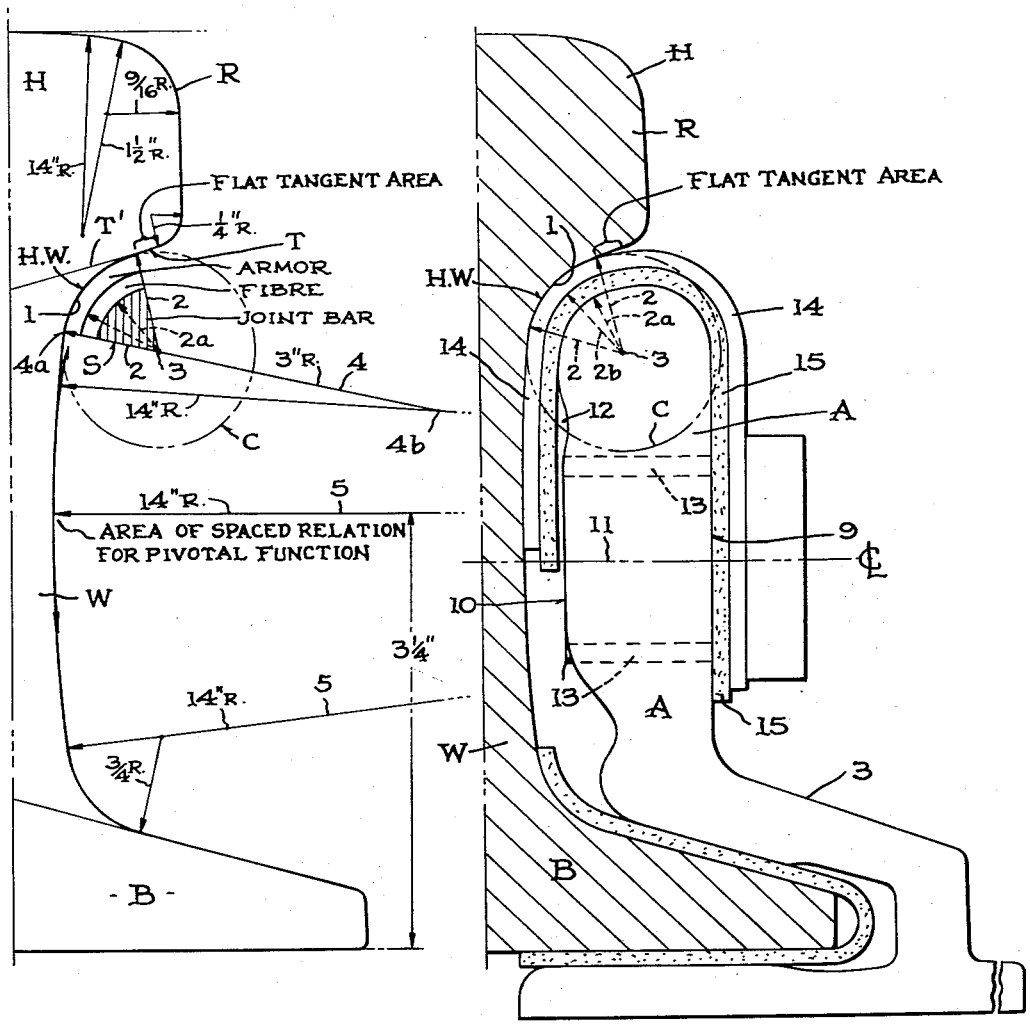

United States Patent Office 3,006,553
Patented Oct. 31, 1961

---

3,006,553
RADIAL HEAD ARMORED INSULATED JOINT
James A. Greer, Kensington, Calif., assignor to Poor & Company, Chicago, Ill., a corporation of Delaware
Filed June 17, 1959, Ser. No. 821,022
1 Claim. (Cl. 238—152)

This application is a continuation-in-part of my co-pending application Serial No. 748,495, filed July 14, 1958, now abandoned, in amplified form.

The invention relates to insulated rail joints, and more especially to what is known in the industry as the "armored type" because the insulation at the head of the bar is protected by a metal sheath.

In the patents to Payne, Nos. 2,441,329 and 2,628,784, for example, the fiber or equivalent insulation is covered by a substantially enveloping or embracting metal plate. According to the structure of these patents, the heads of the bars beneath the insulation present angularly related flat faces, one of which, namely the upper load bearing face, provides an extensive contact area with the underside of the rail head. Moreover, the other and inner face, particularly above the bolt holes in the web, is perpendicular to the center line of the rail at the time of initial installation. And, when the bolts are tightened up, the inner face engages and compresses the adjacent insulation against the inner skirt of the armor. The armor in turn presses against the curved face of the rail web. As will be apparent from the illustration in the Payne patents, as the bolts are tightened and the bars rock inwardly below the center line of the bolts, due to adjustment for service wear in the joint, the inner face of the bar tends to unevenly compress the insulation, while, at the same time, the upper load bearing surface of the bar tends to move outwardly and cause the junction between the two flat surfaces to crowd and pinch the insulation beneath the flat surface at the underside of the rail head. As a consequence under passing wheel loads, the movement of the rail ends in the joint ruptures the armor and insulation permitting water to reach the fiber and materially contribute to its early disintegration, and the consequent destruction of the insulating qualities of the joint. Briefly, therefore, as the base of a Payne bar rocks inwardly and the head rocks outwardly under bolt pressure the angularly related flat load bearing face and the inner face of the bar presents points of concentrated pressure on the insulation and provides potential sources of early destruction of the joint.

Also, in the Payne bars, inner faces of the webs below the bolt holes are so shaped or inclined as to be so thin in the zone of the bolt holes which receive the insulating ferrules that the latter are exposed. This arrangement results in subjecting the inner end portions of the ferrules surrounding the bolts to the hazard of cutting by the edges of the bolt holes, or possibly being punctured by burrs left on the holes as the result of the web punching operation. For this reason, the ferrules also break down.

One of the objects of the invention is to provide an armored insulated joint wherein the fillets of the rail head, the inner surface of the armor, and the inner surface of the insulation are struck on arcs of different radii having the same center, whereby, the insulation will be uniformly clamped between non-angular or irregular surfaces and thereby become compressed solely between mating arcuate surfaces which are entirely devoid of any flat or angular surfaces which tend to concentrate and, therefore, increase pressure at localized substantially linear areas which, as past experience proves, tends to crack or break the insulation and the armor. This new arrangement equally and evenly distributes the loading forces uniformly between the rail head and the bar and, therefore, presents no concentrated area of pressure tending to destroy the insulation under the frequency of the bending of the connecting rail ends and bars under passing wheel loads.

Another object of the invention is to provide joint bars more particularly adapted for use with the ferrules, in the respect that the bars have a thickened web, namely a web defined by substantially parallel outer and inner faces, even though the inner face of the bar may be formed on a relatively wide arc whose crown lies substantially in the bolt holes to provide greatest transverse thickness substantially at the center line of the bolt holes and give maximum protection for insulating ferrules. In that connection, the inner face of the bar is also provided with a shallow groove above the periphery of the bolt holes to provide sufficient space to effect initial installation where the inner face stands free of the insulation and adequate room is provided for permitting the adjustment of the bar under service bolt tightening without compressing and pinching the insulation between the bar and the web of the rail. Moreover, this arrangement enables the inner face of the bar to have a substantial non-rocking firm contact with the die-supporting surfaces at the zone of the bolt holes to facilitate accurate punching of said holes, without drag of extruded metal, avoiding burrs, and generally effecting a more concentrically uniform bearing relation between the tubular insulating bushing and the joint bar.

A further object is to provide insulated joint bars whose head portions are medially depressed to afford a longitudinal clearance or easement beneath the insulation and the armor so that the effect of relative movement caused by rolling wheel loads within the bars is materially reduced, thereby augmenting longevity of the insulation at the location of the joint.

With the above and other objects in view which will appear as the nature of the invention is better understood, the invention consists in the novel construction, and arrangement of parts, hereinafter more fully described, illustrated and claimed.

A preferred and practical embodiment of the invention is shown in the accompanying drawings, in which:

FIGURE 1 is a side elevation of a complete insulated rail joint including bars of the present invention.

FIGURE 2 is an enlarged vertical cross-section taken on the line 2—2 of FIGURE 1.

FIGURE 3 is a fregmentary vertical cross-section taken on the line 3—3 of FIGURE 1.

FIGURE 4 is a vertical cross-section taken on the line 4—4 of FIGURE 1, showing the point bar in end elevation and the rail in cross-section.

FIGURE 5 is a diagrammatic view made from a mill drawing of a half rail section illustrating the manner of forming the cross-sectional profile of the rail while, at the same time, indicating diagrammatically the load bearing sector of the armor, fiber and head of the joint bar.

FIGURE 6 is an enlarged detail sectional view taken on the line 6—6 of FIGURE 3 to more clearly illustrate how the easement at the head of the joint bar relieves the armor and insulation from pressures incidental to the movement of the rail ends in the joint.

Similar reference characters designate corresponding parts throughout the several figures of the drawings.

Before proceeding with a detail description of the joint bars and the insulation units therefor, it is appropriate to refer to accurate reproductions of the half-section profile of a rail as shown by an accurate mill drawing for rolling the rail.

The rails R and R' shown in all of the figures of the drawing each include a head H, a web W and a base B.

Referring more particularly to FIGURES 2, 4 and 5, it will be seen that the head H is provided with a head-web fillet HW formed on an arc 1 whose radius 2 has its center at 3. This axis lies within the head of the joint bar as shown in FIGURES 2 and 4, and in the upper reach of the minor radius 4 of the web.

The outer end of the arc 1 connects with a flat tangent T' which is a continuation of the structural line T', having a 1:4 relationship with the vertical center line of the rail, and, which structurally defines the lower limit of the metal of the head and its connection with the web a the bottom surface of the rail head. The inner end of the arc 1 connects or joins with the arc of the minor radius 4 at the point $4^a$. The said minor radius 4 moves about an axis $4^b$ (FIG. 5), and, in turn connects with the arc of the major radius 5 of the inner face of the web.

The arc 1 of the head-web fillet described by the radii 2 and its center 3 defines a load transmitting zone in the form of a sector S through which wheel loads imposed on the head are transmitted to the joint bars. This sector, diagrammatically indicated in FIGURE 5 includes the armor, the fiber, and a portion of the head of the joint bar. As will be seen from the dotted line radii lines in FIGURE 5, the head-web arc 1, the armor, the fiber and the inner radial head of the joint bar are all formed on spaced concentric arcs having a common center to provide a series of concentric load bearing surfaces which present no angles that would tend to pinch the armor or insulation as the joint bar rocks under initial installation and subsequent service conditions.

In FIGURE 5 the dimensional characteristics of the rail as delineated by the various legends and radii 4, 5, and $5^a$, have intentionally been placed on the present drawing so that they can be identified, if necessary, with the standard mill drawing used in making this figure.

As previously indicated, it is the object of this invention to provide an insulated joint of the armored type which fully utilizes the benefit of concentric arcuate surfaces of the armor and the insulation to provide a uniform load bearing area which avoids contact between the head of the bar and the underside of the rail head.

From FIGURES 4 and 5 it will be seen that if the radius 2 continues to move, it forms the full dotted circle C and the said circle departs or pulls outwardly and downwardly away from the tangent T where the latter connects with the outer end of the head-web fillet arc 1. Therefore, the load bearing portion of the armored insulated unit is located solely or entirely between the mating related arcuate surfaces of the head-web fillet and the arcuate surface of the radial head of the joint bar.

The joint bars designated generally as A are intended to span the ends of the rails R as shown in FIGURE 1. Since the joint bars are duplicated at each side of the rail, it is only necessary for the sake of clarity to show one of the bars in relation to the appropriate bearing portions of the rail.

As more particularly apparent from the profile of the bar A shown in FIGURES 2, 4, and 5, respectively, the same includes a web 6, a transversely arched load bearing head 7 whose inner arcuate portion 8 is formed on a radius $2^a$ which is concentric at 3 with the radius 2 of the head-web fillet HW, and whose crown and outer portion diverge relative to the tangent T and the outer lower corner of the rail head.

It will also be observed that the web 6 is provided with a substantially flat vertical outer bolting face 9 and an inner face 10, which, in the assembly shown is in the form of a relatively wide, that is, substantially flat, arc (on radius 5) whose maximum width is substantially at the location of the center line of the bolt holes 11. The upper portion of the inner face 10 of the web above the bolt holes 11 is formed with a longitudinal groove 12 which, together with wide or flattened arc forming the inner face of the web enables the bars, at the time of initial installation, to stand substantially free of the insulating unit, as shown. Furthermore, the features described allow for the free pivoting of the joint bars, not only during initial application, but to also properly and adequately adjust themselves during bolt tightening take-up as track maintenance conditions require.

It will now be apparent from the foregoing that the web of the present bar is substantially thickened so that it is substantially equal to the length of the insulating bushing or ferrule 13, thereby to prevent rupture in service and at the same time give it more adequate coverage and housing by the armored insulated unit.

Since the outer and inner faces of the web are substantially parallel, the bar provides the advantage of having a firm bearing on the bed of the punching die, and also provides maximum horizontal web thickness to serve the multiple functions of; facilitating the punching of the bolt holes with a minimum of deformation; making the interior bolt hole surfaces at right angles to the outer face of the web; and insuring that the sides of the bolt holes are more nearly parallel to the side wall of the annular ferrule or bushing 13, having due regard for maximum and minimum dimensional allowances.

FIGURE 2 shows that the extreme inner end of the bushings are substantially covered and protected and also supported by the greater depth of the bolt holes provided by the construction referred to.

The inner upper radial head portion of the web of the bar is formed on the arc $2^a$ having a radius whose center is concentric with the point or axis 3. As shown in FIGURES 2 and 5, the upper portion of the head arc moves away from the bottom face of the bar beginning at the junction of the outer end of the arc of the head-web fillet with the tangent T. Thus, the load bearing surface of the head of the bar is defined by a radius having a common center with the radius of the head-web fillet of the particular rail section with which the bar is used, and follows the dotted circle C without sharp interruption in the direction of the outer face 9 of the bar.

The insulating unit covering the head of the bar includes an outer metallic armor 14 and an inner insulating member 15. The armor and the insulation member are of substantially inverted U-shaped formation and their contour conforms to the cross-sectional shape of the bar head. The insulation member continues downwardly from the bight of the U on opposite faces of the joint bar, and in both cases, the lower edge portion of the insulation projects below the center line of the bolt holes.

The inner arcuate load bearing portion of the armor; and the mating load bearing portion of the insulation member are formed on arcs described by radii $2^b$ (FIG. 4) and $2^a$ respectively, whose axes lie in the point 3, the insulation arc being the same as the arc of the radial head.

Since the curvature of the inner radial head of the bar describes an arc which mates with the arc of the head-web fillet of the rail, and the radius of the head-web fillet as well as the radii of the related portion of the armor and insulation member are all concentric, they provide uniform loading areas only in the region of the head-web fillets of the rail. In other words, since the radii of the arcs of the head-web fillet; the radial head of the bar and the intervening metallic armor and insulation member are all formed on radii of different length but whose axes are concentric, the present invention provides uniform loading areas only in the region of the head-web fillets of the rail, as distinguished from engagement with any tangent surfaces.

The area (FIGS. 2 and 5) in the zone of the head-web fillet HW bounded by a pair of spaced radii 2 having a common center 3 lying in the upper reach of the minor radius 4 of the rail web, and the arc 1 subtended from said radii, defines the said sector S lying solely between the tangent surface T adjacent the outer bottom surface of the rail head and the point $4^a$ at the junction or connection of the arc 1 with the major arc of the rail web formed on the radius 5.

In accordance with the usual practice, the space between the ends of the rails is provided with an insulating end post E.

At the location of the end post, that is at substantially the middle of the joint bars, each bar is provided with a depressed portion 17, shown in dotted lines in FIG. 1, and made substantially apparent in enlarged detail in FIG. 6. So far as I am aware it has not been heretofore proposed to utilize an easement of this kind in an insulated joint with attendant advantages. This depression or easement form a space between the head of the bar and the insulating member 15. This easement 17 extends longitudinally of the bar head and also laterally into the zone of the arc of the sector described, and also extends laterally outward of the outer edge of the rail head. It will, of course, be understood that the armor and insulation member do not extend longitudinally across the depression 17 (FIG. 6). However, because of this easement as passing wheel loads shift from one rail to the other, the relative movement between the rail ends will not impose the full effect of destructive forces on the insulation in the zone of the easement. Moreover, should there be any burrs left on the rail ends after shearing, they will not cut the insulation or concentrate on flexing force in the relatively narrow zone where the end post E is installed.

From the foregoing description it will now be seen that the present invention departs from all prior art practices with respect to armored insulated joints in the respect that there are no flat surfaces between the underside of the rail head and the upper portion of the joint bar as well as the interposed armor and insulation.

Moreover, the invention permits of ready and effective installation and subsequent service of the bars in track because of the fact that the inner face of the bar initially stands free of the insulation and as it compresses, the groove beneath the arcuate radial head will permit further adjustment of the base of the bar as the head tends to rock outwardly on the mating curved surfaces, all of whose axes are concentric, thereby tending to further part company between the tangent surfaces of the rail head and any portion of the insulating unit.

I claim:

In an insulated rail joint wherein the rails have head-web load transmitting fillets each formed on a circular arc disposed between a flat tangent adjacent the outer bottom face of the rail head and the related arc of the rail web, joint bars each having a head and a foot portion connected by a web, a load bearing surface on said bar head formed on a circular arc whose radius is shorter than the radius of the arc of the head web fillet of the rail and an inverted substantially U-shaped laminated metal armor and fiber insulation unit fitted over the head of each bar, the bight of said unit having metal and insulating surfaces formed on radii of different lengths, the radii of said head-web fillets, the armor and the insulation all having a common center lying in the head of the bar, whereby solely subjecting the fiber insulation of said unit to uniform load transmitting stresses between the mating arcs of the head-web fillets and the bar head.

References Cited in the file of this patent

UNITED STATES PATENTS

| | | |
|---|---|---|
| 1,713,410 | Thomson | May 14, 1929 |
| 1,935,722 | Langford | Nov. 21, 1933 |
| 2,120,428 | Lee | June 14, 1938 |
| 2,441,329 | Payne | May 11, 1948 |
| 2,717,739 | Burkhart et al. | Sept. 13, 1955 |
| 2,793,816 | Lansing | May 28, 1957 |
| 2,894,690 | Hedrick | July 14, 1959 |
| 2,936,126 | Greer | May 10, 1960 |